United States Patent
Calais et al.

(10) Patent No.: US 11,555,925 B2
(45) Date of Patent: Jan. 17, 2023

(54) AUTOMOTIVE LEVEL DETERMINATION

(71) Applicant: Valeo North America, Inc., Troy, MI (US)

(72) Inventors: Valere Calais, Orsay (FR); John Orisich, Columbus, IN (US); Brant Potter, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 979 days.

(21) Appl. No.: 16/209,270

(22) Filed: Dec. 4, 2018

(65) Prior Publication Data

US 2020/0174121 A1 Jun. 4, 2020

(51) Int. Cl.
| | |
|---|---|
| *G01S 17/10* | (2020.01) |
| *G01S 7/481* | (2006.01) |
| *G06T 7/70* | (2017.01) |
| *B60Q 1/04* | (2006.01) |
| *G01S 7/4865* | (2020.01) |

(52) U.S. Cl.
CPC ............... *G01S 17/10* (2013.01); *B60Q 1/04* (2013.01); *G01S 7/4813* (2013.01); *G01S 7/4865* (2013.01); *G06T 7/70* (2017.01); *G06T 2207/30244* (2013.01)

(58) Field of Classification Search
CPC .... G01S 7/4813; G01S 17/931; G01S 7/4863; G01S 17/89; G01S 17/894; G01S 17/10; G01S 7/4865; B60W 30/08; B60W 2420/52; G06T 7/70; G06T 2207/30244; B60Q 1/04
See application file for complete search history.

(56) References Cited

U.S. PATENT DOCUMENTS

| | | | |
|---|---|---|---|
| 3,602,719 A | 8/1971 | Jacobs | |
| 2006/0242850 A1 | 11/2006 | Ammann et al. | |

FOREIGN PATENT DOCUMENTS

| | | | | |
|---|---|---|---|---|
| DE | 102004052434 A1 | * | 5/2006 | ........... B60Q 1/1423 |
| DE | 102011081384 A1 | * | 2/2013 | ............. G01S 17/10 |
| DE | 102014000235 A1 | * | 7/2014 | ........... B60G 17/019 |
| FR | 2279066 A1 | | 2/1976 | |
| JP | 55-052903 A | | 4/1980 | |
| SK | 287855 B6 | | 1/2012 | |

* cited by examiner

*Primary Examiner* — Luke D Ratcliffe
(74) *Attorney, Agent, or Firm* — Valeo North America, Inc.

(57) ABSTRACT

To determine spatial orientation of a vehicle, a set of illuminators is mechanically coupled to the vehicle so as to emit light toward a roadway. A set of sensors is mechanically coupled to the vehicle to receive the emitted light as reflected from the roadway. A timer determines times of flight between emission of the light by the set of illuminators and reception of the reflected light by the set of sensors. A processor determines the spatial orientation of the vehicle from a difference in the times of flight.

14 Claims, 8 Drawing Sheets

Δt Function of θ

AUTOMOTIVE LEVEL DETERMINATION

BACKGROUND

Modern headlamps are designed to project a particular distribution of light to optimize the reach of the headlamp while protecting other drivers from dazzle, a temporary blinding effect caused by light shining in a driver's eyes. Such headlamps may project light across multiple lanes of travel with the farthest reach being directly in line with the vehicle's trajectory and less reach and, in some cases, less light in the direction of oncoming traffic. Typically, headlamps are statically aligned while the vehicle is stationary and level to have a specific lighting profile that translates to a corresponding distribution of light on a roadway. However, a vehicle does not remain level with respect to the roadway while the vehicle is in motion. Consequently, the desired distribution of light on the roadway, that expected when the vehicle is level with respect to the roadway, is not maintained.

There are multiple reasons why a vehicle in motion does not remain level with respect to the roadway. Acceleration and deceleration of the vehicle causes a tipping of the vehicle from front to back and vice versa. Even under constant speed, the vehicle may ride at an angle with respect to the roadway and such angle may be dependent on the speed of the vehicle. Moreover, the vehicle may be carrying a load, such as in the trunk, that changes the weight distribution over the vehicle and hence the angle thereof relative to the roadway.

In addition to static alignment, certain headlamps can be aimed dynamically while the vehicle is in motion. Such dynamic aiming may be used to compensate for out-of-level conditions so as to maintain a consistent light distribution over the roadway. However, to do so, one must first determine how far out of level the vehicle is at any given moment. The search for efficient and accurate techniques by which this can be achieved is ongoing.

SUMMARY

To determine spatial orientation of a vehicle, a set of illuminators is mechanically coupled to the vehicle so as to emit light toward a roadway. A set of sensors is mechanically coupled to the vehicle to receive the emitted light as reflected from the roadway. A timer determines times of flight between emission of the light by the set of illuminators and reception of the reflected light by the set of sensors. A processor determines the spatial orientation of the vehicle from a difference in the times of flight.

DETAILED DESCRIPTION

Figure 1:
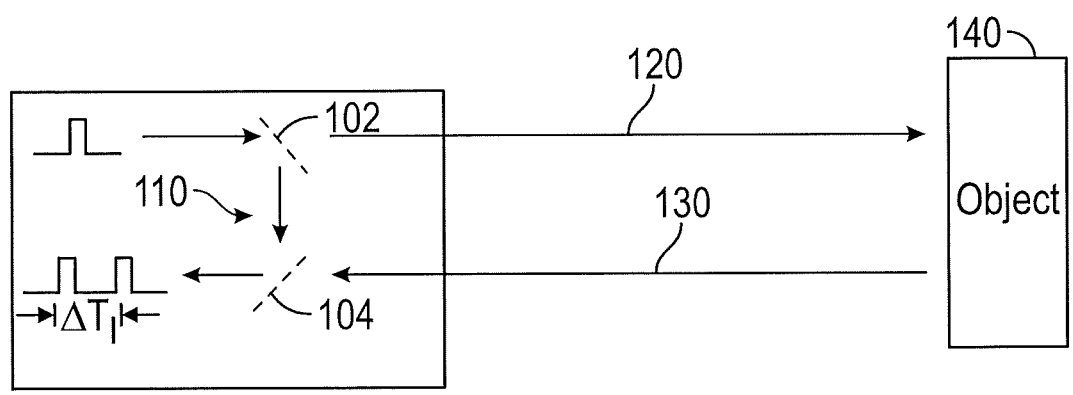
FIG. 1 is a schematic block diagram of an example rangefinder that can be used in conjunction with embodiments of the present invention.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

For purposes of explanation and not limitation, the spatial orientation of vehicles described herein will be with reference to three mutually orthogonal planes: the pitch plane in which a change in pitch angle represents a lowering (motion toward the roadway) of the vehicle's front end relative to its rear end; the roll plane in which a change in roll angle represents a lowering (motion toward the roadway) of the vehicle's left side relative to its right side; and a yaw plane in which a change in yaw angle represents rotation to the right of the front end of the vehicle in a plane parallel to the roadway surface. The intersection of these three planes forms a set of reference axes: a pitch axis, a roll axis and a yaw axis. A vehicle that is "level" with the roadway has a center of mass at the origin of these three axes and may be calibrated to a reference orientation of 0° pitch angle in the patch plane relative to the pitch axis, 0° roll angle in the roll plane relative to the roll axis and 0° yaw angle in the yaw plane (parallel with the surface of the roadway) relative to the yaw axis. Such calibration may be performed at time of manufacture while the vehicle is on a smooth, level surface. In this reference orientation, a reference $\Delta T$, referred to herein as $\Delta T_{REF}$, may be taken by measurement, which indicates that the vehicle is level, as will be discussed in further detail below.

The vehicle's suspension will support relative movement of the vehicle body with respect to the tires and, in certain cases, a vehicle may pitch (i.e., undergo a change in pitch angle) while the tires of the vehicle are in contact and consequently parallel with the roadway. This may occur when, for example, the vehicle is accelerating or is under a load, such as in the trunk. The same is true for the roll and yaw axes—the tires of the vehicle may be parallel to the roadway (but not necessarily) while the vehicle body rolls and yaws in response to net forces in those directions. Whereas, embodiments are described with reference to vehicle pitch, those having skill in the arts will appreciate that the invention can be used to detect and correct for pitch, roll and yaw.

FIG. 1 is a schematic block diagram of an example rangefinder 100 that can be used in conjunction with embodiments of the present invention. The diagram of FIG. 1 is intended to impart general principles of range finding and, as such, not all components of rangefinder 100 are illustrated in the figure.

As illustrated FIG. 1, a pulse of light is emitted by an illuminator (not illustrated in FIG. 1) and transmitted through a partially reflective optical component 102 (e.g., a beamsplitter) as internal beam 110 and transmitted beam 120. Internal beam 110 may be directed to a sensor (not illustrated in FIG. 1) by way of another partially reflective optical component 104. Meanwhile, transmitted beam 120 may impinge upon an object 140 and return to rangefinder 100 as reflected beam 130. Reflected beam 130 may pass through partially reflective component 104 and onto the rangefinder's sensor. The sensor responds to the pulse of internal beam 110 and to the pulse of reflected beam 130 and the time between the two pulses, $\Delta T_I$, is measured. $\Delta T_I$ is a measurement of the time of flight for the transmitted pulse to traverse the medium, reflect off of object 140 and return to the sensor. The distance from rangefinder 100 to object 140 is determined from $\Delta T_I$ and the speed of light.

Figure 2:
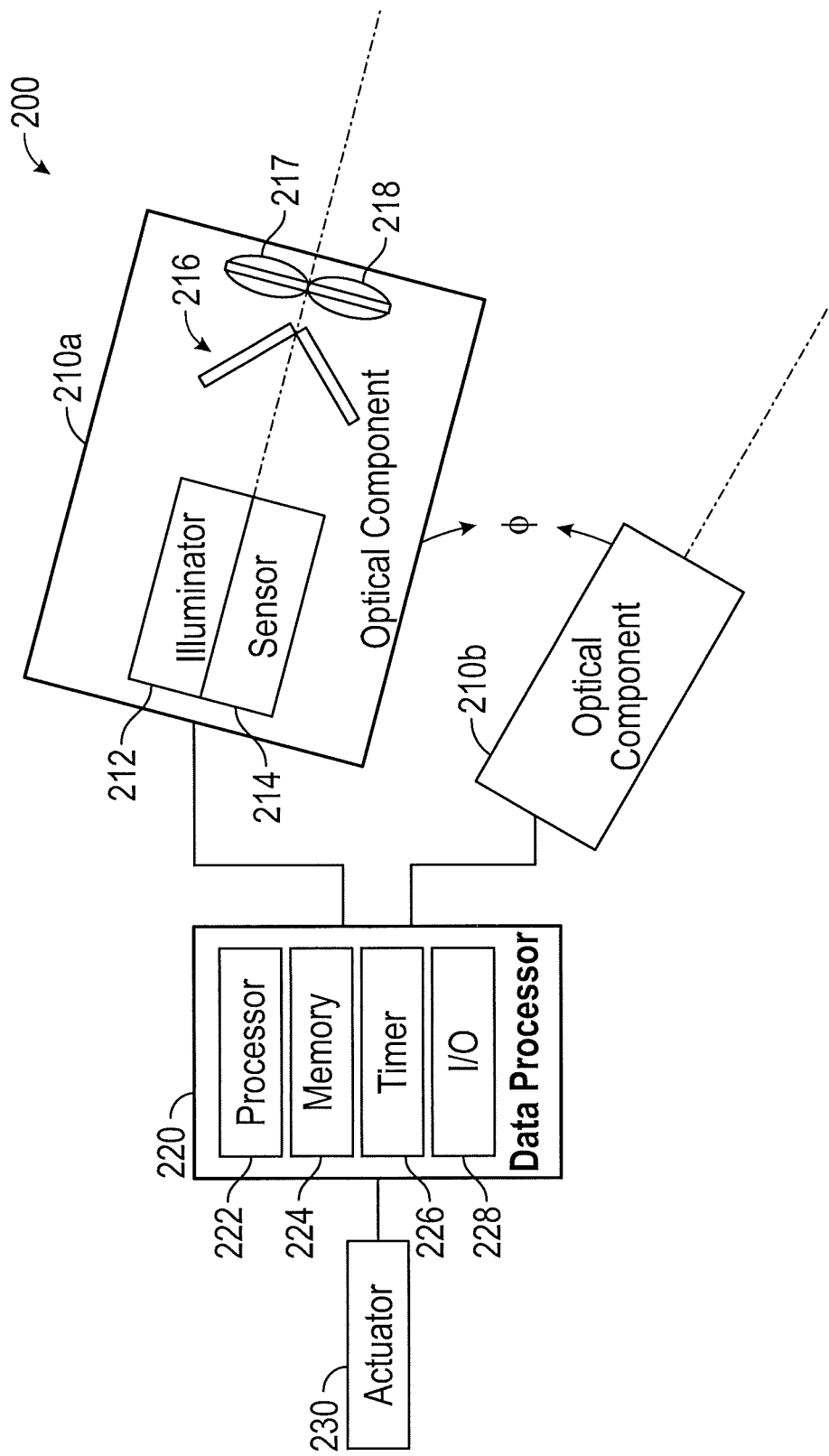
FIG. 2 is a schematic block diagram of an example orientation determining device by which the present invention can be embodied.

FIG. 2 is a schematic block diagram of an example orientation determining device 200 by which the present invention can be embodied. In accordance with aspects of the invention, orientation determining device 200 determines the orientation of a vehicle in which the device is installed relative to the mean roadway surface. This aspect is discussed further below; the embodiment of FIG. 2 is intended to illustrate possible hardware components by which the techniques described herein can be achieved.

As illustrated in FIG. 2, example orientation determining device 200 includes a pair of optical components 210a and 210b, representatively referred to herein as optical component(s) 210. Optical components 210 may operate in accordance with the principles described with reference to FIG. 1. Each optical component 210 may be constructed or otherwise configured with an illuminator component 212 to emit pulses of light towards a target and a sensor component 214 to generate a signal responsive to light impinging thereon. Additionally, each optical component 210 may include partially-reflective optics 216 to direct a portion of the transmitted light onto sensor component 214 as described above. Collimating and/or focusing optics 217 and 218 may be positioned in the optical paths of illuminator component 212 and sensor component 214, respectively.

Illuminator component 212 may be constructed or otherwise configured to emit light in a predetermined direction. In certain automotive embodiments, illuminator component 212 is a pulsed laser mounted in a forward direction such that the roadway on which the vehicle is traveling is illuminated. The laser may emit each pulse according to a pulse repetition frequency (PRF), which may be established by a designer. In one embodiment, the PRF is 3 Hz.

Figure 3:
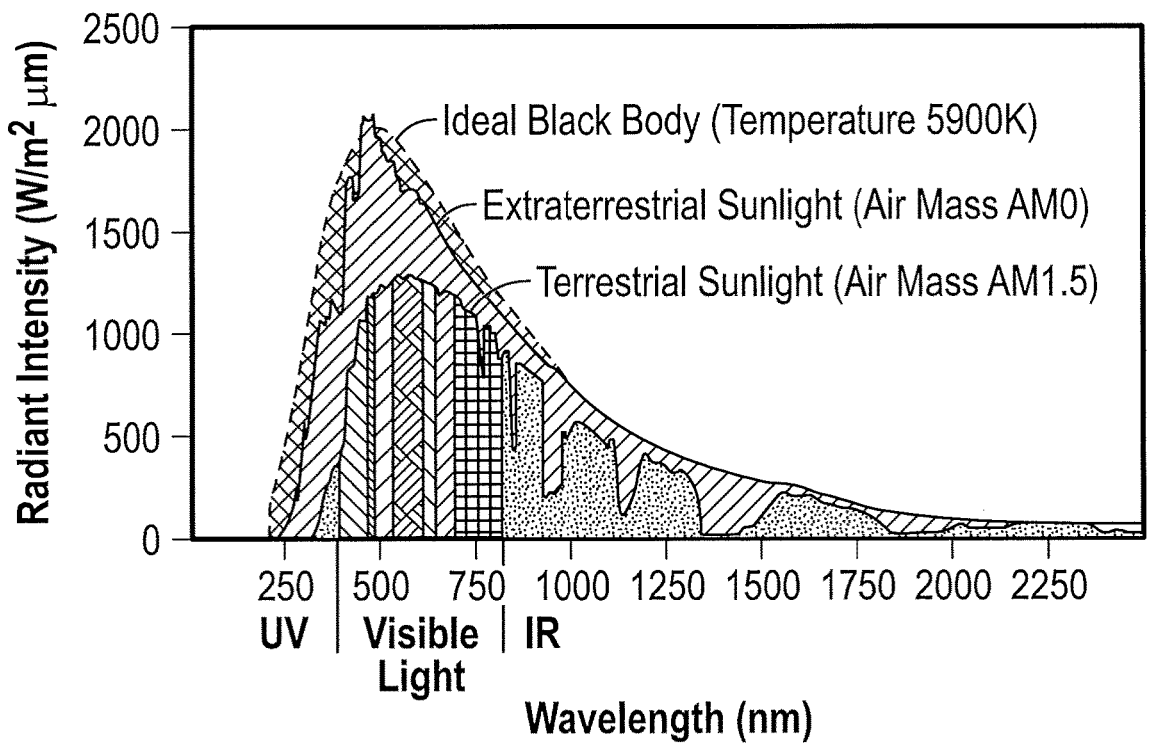
FIG. 3 is a graph of electromagnetic radiant intensity of the Sun versus wavelength.

Illuminator component 212 may also be constructed or otherwise configured to emit a particular wavelength of light. FIG. 3 is a graph of electromagnetic radiant intensity of the Sun versus wavelength. It is to be noted that there is an intensity minimum between approximately 1300 nm and 1400 nm. In certain embodiments, illuminator component 212 emits infrared light at a wavelength 1330 nm to take advantage of minimum interference by sunlight at that wavelength. This allows a laser of less power to be used. In one embodiment, illuminator component 212 operates at a 100 mW power level.

Sensor component 233 may be mounted with illuminator component 231 so as to accept light coming from the direction in which the beam is transmitted. In certain embodiments, sensor component 214 is a photodiode that is responsive to the transmitted wavelength. Those having skill in the art will recognize different sensor configurations that can be used in conjunction with embodiments of the invention without departing from the spirit and intended scope thereof.

As illustrated in FIG. 2, optical components 210 may be mounted in a vehicle such that beams 202 and 204 are angularly offset one to the other by an angle $\phi$ in the vehicle's pitch plane. Certain embodiments realize an angle $\phi$ in the range of 10°-25°. Such configuration defines a pair of distance measurements that can, through suitable data processing, identify the pitch angle $\theta$ that the vehicle makes relative to the surface of the roadway. Moreover, since the illumination beams of orientation determining device 200 are directed forward of the vehicle, changes in grade in the roadway may be detected prior to the vehicle reaching that point of the roadway.

Figure 4:
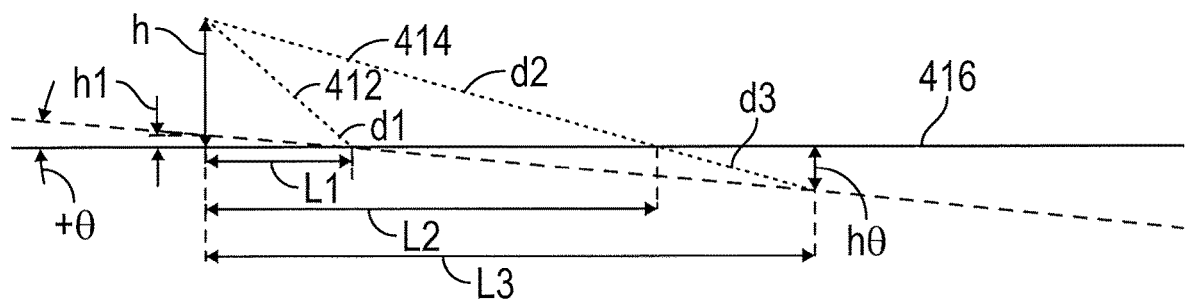
FIG. 4 is a diagram illustrating a pair of measurements made in one embodiment of the invention.

FIG. 4 is a diagram illustrating a pair of measurements 412 and 414 made in one embodiment of the invention. It is to be assumed that the vehicle making the measurements is pitched (tilted toward the roadway from back to front) at an angle $\theta$ with respect to the roadway 416. Measurements 412 and 414 may be made by determining the time it takes for a transmitted pulses of light to reflect off of roadway 416 and return to the corresponding sensor, $$\Delta T = \frac{2*(d2-d1)}{c},$$

where d1 is the distance from one optical component 210 to the roadway, d2 is the distance from another optical component 210 to the roadway and c is the speed of light. The time $\Delta T$ should not be confused with $\Delta T_I$ described above; the former is the difference in time of flight between pulses for two distance measurements and the latter is an internal time between a transmit pulse and its echo. That is, $\Delta T$ is the time of flight difference between the pulse transmitted and received by one optical component 210 and that transmitted and received by the other optical component 210. On a smooth and level surface, $\Delta T=\Delta T_{REF}$, which can be determined by suitable measurement. The difference in the time $\Delta T$ due to the angle $\theta$ is given by, $$\Delta t = \frac{2*(d3-d2)}{c}, \quad (1)$$

where d3 is the additional distance the light from the illuminator would travel when the vehicle is pitched relative to the roadway at the angle $\theta$. Equation (1) can be reorganized to reveal, $$d3 = \frac{c\Delta t}{2} + d2.$$

Applying Thales theorem, $$\frac{d3-d2}{d2} = \frac{L3-L2}{L2} \Rightarrow d3 = d2\left(\frac{L3}{L2}\right), \quad (2)$$

where L2 is the distance along the roadway from one optical component to the measurement point of that optical component, L3 is distance along the roadway to where the measurement point would be if the vehicle were level with the roadway, i.e., L2=L3 when the vehicle is level with the roadway. Note that in this condition where L2=L3, $\Delta t$ is zero and $\Delta T$ is $\Delta T_{REF}$.

From equations (1) and (2) and Pythagoras' theorem, $$\frac{c\Delta t}{2} = \left(\frac{L3-L2}{L2}\right)d2 = \left(\frac{L3-L2}{L2}\right)\sqrt{h^2+L2^2}, \quad (3)$$

$$L3 = L2\left(\frac{c\Delta t}{2\sqrt{h^2+L2^2}} + 1\right).$$

where h is the distance of the optical component from the roadway. It is to be noted that equation (3) expresses L3 as a function of known design parameters c, h, L2 and the measurement $\Delta t$.

The distance h1 between the roadway and a hypothetical location of the roadway at the sensor vertical caused by the angle $\theta$ can be given by, $$h1 = L1*\tan(\theta),$$

where L1 is the distance along the roadway from the other optical component to the measurement point of the other optical component.

Applying Thales theorem, $$\frac{L1}{L3-L1} = \frac{h1}{h\theta},$$

where $h\theta$ is defined in FIG. 2, $$h\theta = \tan(\theta)(L3-L1).$$

Applying Thales theorem once again, $$\frac{h\theta}{h} = \frac{L3-L2}{L2} \Rightarrow \frac{(L3-L1)\tan(\theta)}{h} = \frac{L3-L2}{L2}, \quad (4)$$

-continued $$L2(L3-L1)\tan(\theta) = h(L3-L2),$$

$$\tan(\theta) = \frac{h(L3-L2)}{L2(L3-L1)} = \frac{h\left(\frac{c\Delta t}{2\sqrt{h^2+L2^2}}\right)}{L2\left(\frac{c\Delta t}{2\sqrt{h^2+L2^2}}\right)-L1},$$

$$\theta = \arctan\left(\frac{h\left(\frac{c\Delta t}{2\sqrt{h^2+L2^2}}\right)}{L2\left(\frac{c\Delta t}{2\sqrt{h^2+L2^2}}\right)-L1}\right),$$

which expresses $\theta$ in terms of fixed design parameters c, h, L1 and L2, and the measurement $\Delta t$. The measurement $\Delta t$ can be determined from variations in $\Delta T$ from $\Delta T_{REF}$ as the vehicle travels, where $\Delta T_{REF}$, L1 and L2 are known design parameters that apply when the vehicle is level with the roadway (in the reference orientation). It is to be noted that $\theta$ is determined using only two distance measurements which manifests as $\Delta t$.

Returning to FIG. 2, processor component 222 may be constructed or otherwise configured to control the operation of orientation determining device 210 in accordance with parameters stored in memory component 224 (e.g., illuminator power, PRF, etc.). Indeed, memory component 224 may store processor instructions that processor component 222 executes to implement the control functionality. Memory 224 may also store system constants that are fixed by design, such as c, h, L1 and L2. Processor component 222 may also determine $\Delta t=\Delta T-\Delta T_{REF}$ or the difference between the measured time of flight of pulses for optical components 210 and the reference time difference thereof. In certain embodiments, $$\Delta t = \Delta T_{I,1} - \Delta T_{I,2} - \Delta T_{REF},$$

where $\Delta T_{I,1}$ is the time of flight for the distance measurement of a first optical component, e.g., optical component 210a, and $\Delta T_{I,1}$ is the time of flight for the distance measurement of a second optical component, e.g., optical component 210b.

Processor component 222 is, for example, one or more data processing devices such as microprocessors, microcontrollers, systems on a chip (SOCs), or other fixed or programmable logic, that executes instructions for process logic stored in memory component 224. Processor component 222 may be a multi-processor, and have multiple CPUs, multiple cores, multiple dies comprising multiple processors, etc.

Memory component 224 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity.

Timer component 226 may be constructed or otherwise configured to determine the time between the transmitted and received pulses of each optical component, i.e., $\Delta T_I$ the time of flight difference between measurements by each optical device $\Delta T$. Timer component 235 may also control the PRF of the transmitted signal. Various timer and clock circuits may be used to realize this functionality, as those skilled in the art will acknowledge.

I/O component 228 may be constructed or otherwise configured to interface with external circuits, such as an actuator component 230. I/O component 228 may provide a signal to actuator component 230 to compensate for the pitch angle θ. In one embodiment, actuator component 230 may be mechanically coupled to the vehicle suspension, whereby the vehicle is made level with the roadway. In another embodiment, actuator 230 is mechanically coupled to elements in the vehicle's headlamp assembly, whereby the headlamp beam cutoff is adjusted for the angle θ.

Figure 5:
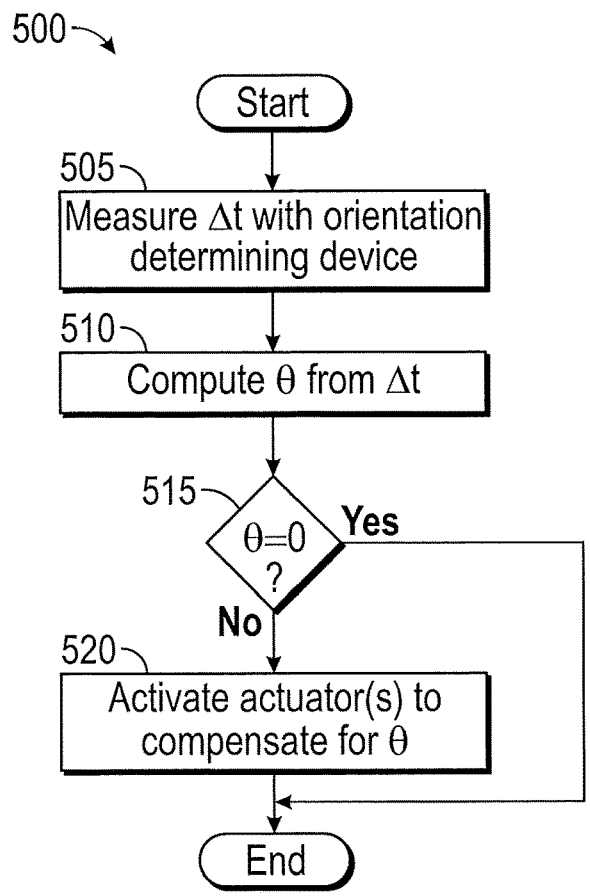
FIG. 5 is a flow diagram of an exemplary process 500 by which the present invention can be embodied.

FIG. 5 is a flow diagram of an exemplary process 500 by which the present invention can be embodied. In operation 505, Δt is determined from variations of ΔT measured by an orientation determining device and, in operation 510, the pitch angle θ is computed from the measurement of Δt, such as by equation (4) above. In operation 515, it is determined whether the vehicle is level, which occurs when θ=0. If the vehicle is level, process 500 may end. Otherwise, process 500 may transition to operation 520, whereby one or more actuators are activated to compensate for the pitch angle θ. Such compensation may be achieved by leveling the vehicle, in which case the actuator(s) are mechanically coupled to the vehicle suspension, or by adjusting the headlamps to alter the lighting pattern on the roadway to meet certain specifications and/or regulations, in which case the actuator(s) are mechanically coupled to lamp assemblies or components therein.

Figure 6:
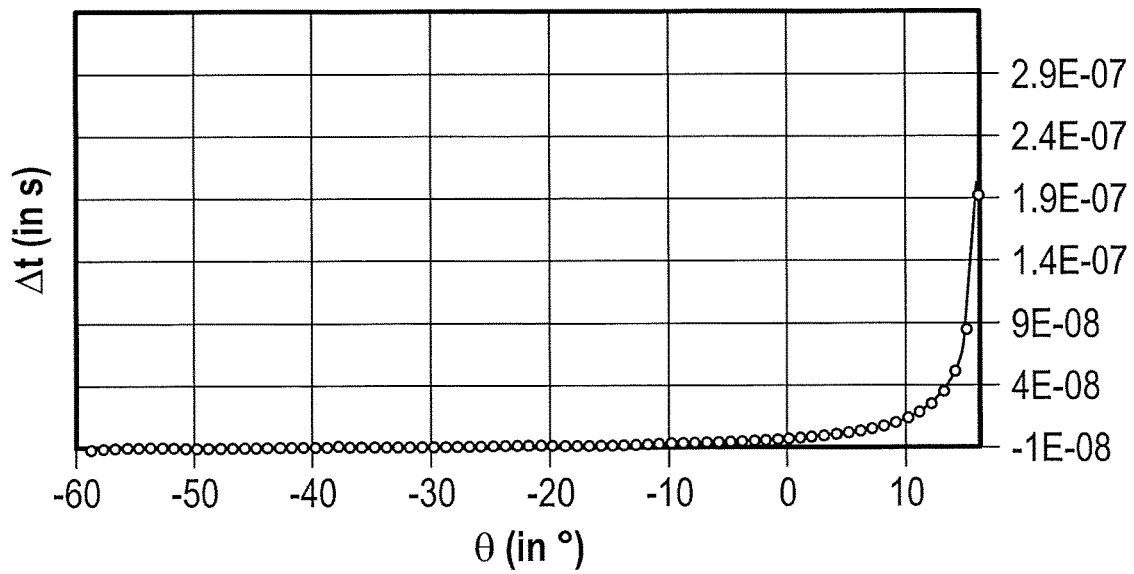
FIG. 6 is a graph illustrating $\Delta t$, a change in $\Delta T$ due to a vehicle being pitched at an angle $\theta$, as a function of pitch angle $\theta$ according to an embodiment of the present invention.

FIG. 6 is a graph illustrating Δt as a function of θ, which demonstrates possible measurements of θ between −60° and 17°. For Δt=13.3 ps, the worst precision of ±0.2° is at the extreme negative value of θ. At the extreme positive value of θ, the precision is ±0.6E−4°. For angles of −20° to 17°, the precision is better than 0.1°. In certain embodiments, actuator 230 provides ±6° of movement and the precision in this range is approximately ±0.03°. Angles of greater than 20° can be considered an obstacle to travel and, in certain embodiments, an alarm to indicate such may be provided to the driver.

From a radiometric point of view, the illuminated area on the surface of the roadway may define a rectangle of length L=L2−L1 (L=1.70 m in one example) and of width W. Width W, which may be established by illuminator beam divergence and/or illuminator optics, should be much smaller than length L, i.e., W<<L to avoid perturbations in the measurement. In one example embodiment, W=0.10 m. This defines a rectangle having surface area $S_{road}$=0.17 m.

Figure 7:
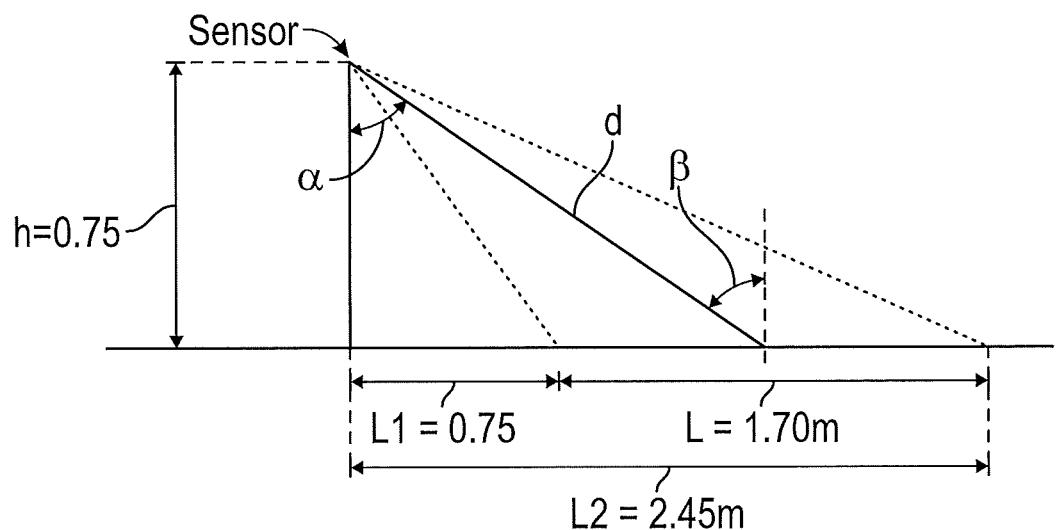
FIG. 7 is a diagram illustrating the geometry of an embodiment of the invention for purposes of selecting a sensor configuration.

FIG. 7 is a diagram illustrating the geometry of an embodiment of the invention for purposes of selecting a sensor configuration. Assuming the roadway is a Lambertian surface with an albedo of 50%, what is sought is the amount of flux from the roadway surface for a sensor having a surface area $S_{sensor}$.

$$G = \frac{S_{road} * S_{sensor} * \cos(\alpha) * \cos(\beta)}{d^2},$$

$L = \frac{E\rho}{\pi}$, because the surface is Lambertian ($\rho$ is albedo), $$E = \frac{P}{S_{road}},$$

$F = L * G$ if $S_{sensor} \ll S_{road}$, $$d = \sqrt{h^2 + \left(L1 - \frac{L}{2}\right)^2},$$

$$\alpha = \arctan\left(\frac{L1 - \frac{L}{2}}{h}\right);$$

$$\beta = \arctan\left(\frac{\pi}{2} - \alpha\right).$$

Selecting a 4 cm diameter lens to collect light at the sensor (lens 218) and the aforementioned illuminator power level of P=100 mW, G=1.005171 m², E=0.29 W/m² and F=9.84E−6 W. In the present example, the power on the sensor is 3270 nW. Accordingly, a photodiode may be chosen with a response starting at 5 nW (twice the dark current).

Figure 8A:
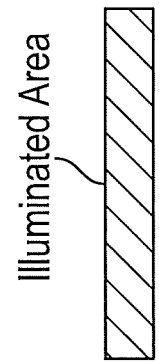
FIGS. 8A and 8B are diagrams illustrating alternative embodiments of the present invention.
Figure 8A:
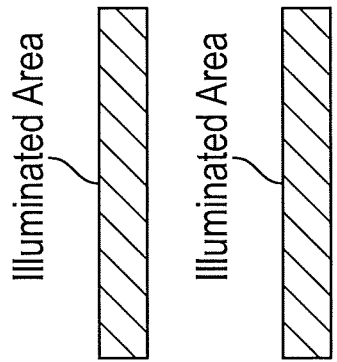
Figure 8A:
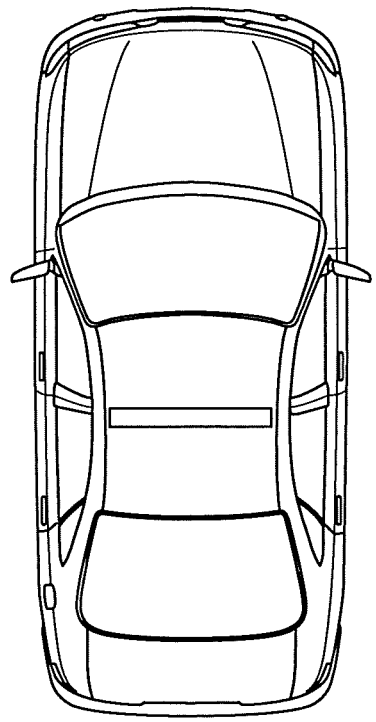
Figure 8B:
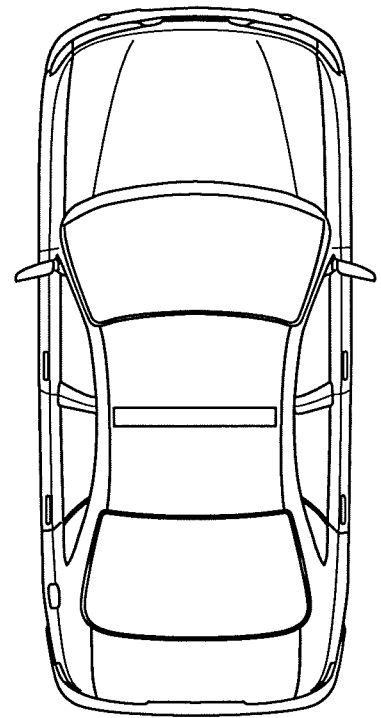

FIGS. 8A and 8B are diagrams illustrating alternative embodiments of the present invention. In FIG. 8A, a single orientation determining device is mounted in a vehicle, such as in the vehicle's forward bumper. Such configuration can be used to identify the pitch angle θ as described above. In FIG. 8B, a pair of orientation determining devices are mounted in a vehicle, such as in the vehicle's forward bumper or in respective headlamp assemblies. In this configuration, the roll angle of the vehicle relative to the road can be determined. That is, each orientation determining device makes a measurement of the pitch angle θ and the difference between angles θ can be attributed to the roll angle. Certain embodiments of the invention include more than one actuator, e.g., an actuator to level the vehicle in one direction and another to level the vehicle in a transverse direction, electrically connected to each orientation determining device.

Figure 9:
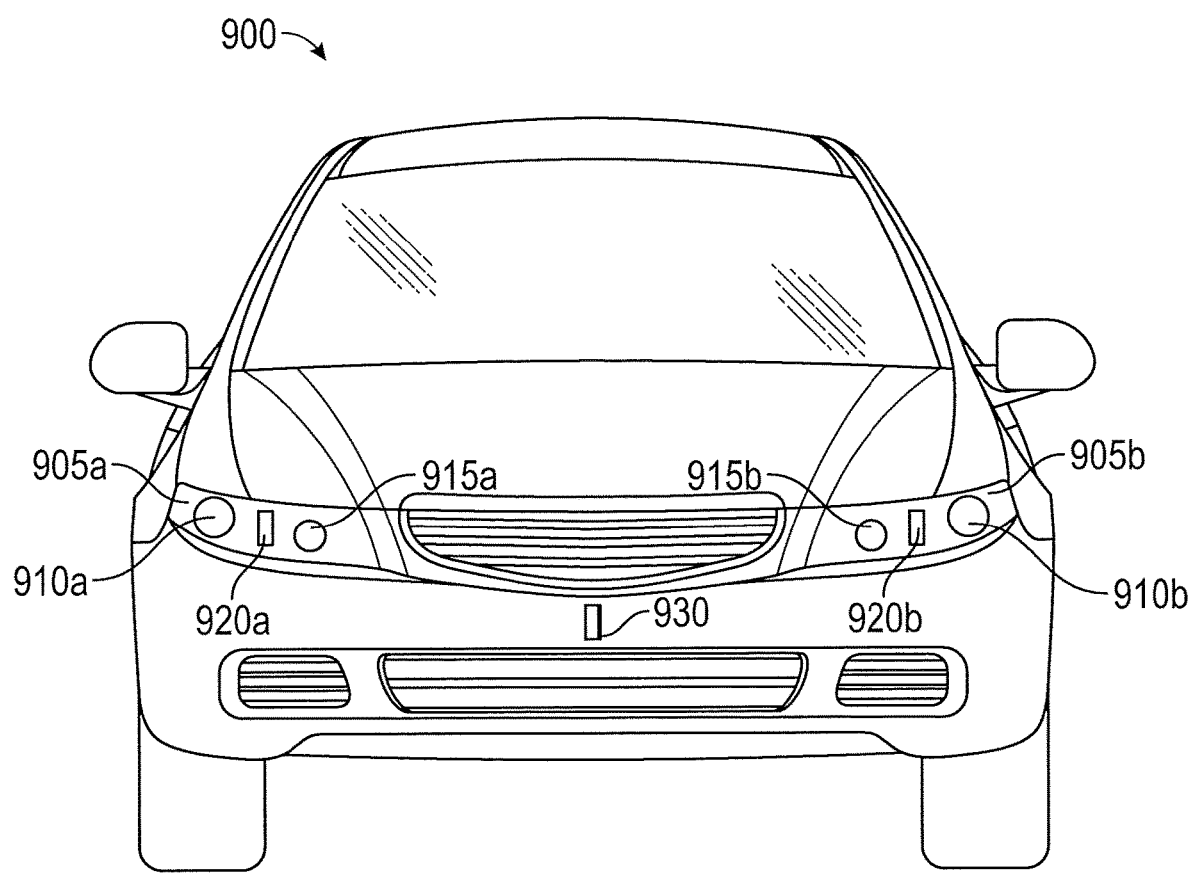
FIG. 9 illustrates a front-end of an exemplary motor vehicle in which the present invention can be embodied.

FIG. 9 illustrates a front-end of an exemplary motor vehicle 800. Motor vehicle 900 includes two lamp assemblies 905a and 905b, representatively referred to herein as lamp assembly(-ies) 905. Lamp assemblies 905 include low beam headlamps 910a and 910b, representatively referred to herein as low beam headlamp(s) 910, and high beam headlamps 915a and 915b, representatively referred to herein as high beam headlamp(s) 915. Low beam aspects may also be referred to as lower or dipped beam aspects and high beam aspects may also be referred main or driving beam aspects. Typically, the low beam headlamps 910 are used whenever another vehicle is on the road directly ahead of motor vehicle 900 and/or whenever another vehicle is approaching motor vehicle 900 from an opposite direction.

It is to be understood that while motor vehicle 900 is illustrated as a passenger automobile, the present invention is not so limited. Other motor vehicles may embody the present invention, as will be apparent to the skilled artisan upon review of this disclosure.

As illustrated in FIG. 9, each lamp assembly 905 may include a corresponding orientation determining device 920a and 920b. This corresponds to the configuration of FIG. 8B, by which both the pitch and roll angles can be determined. Additionally or alternatively, an orientation determining device 930 may be centrally mounted on the bumper of vehicle 900. This corresponds to the configuration of FIG. 8A, by which the pitch angle can be determined. It is to be understood that more than one orientation determining device 930 may be mounted in the vehicle's bumper or elsewhere on the vehicle body. Orientation determining devices 920a, 920b and 930 may be implemented in a manner similar to orientation determining device 200 in FIG. 2.

Figure 10:
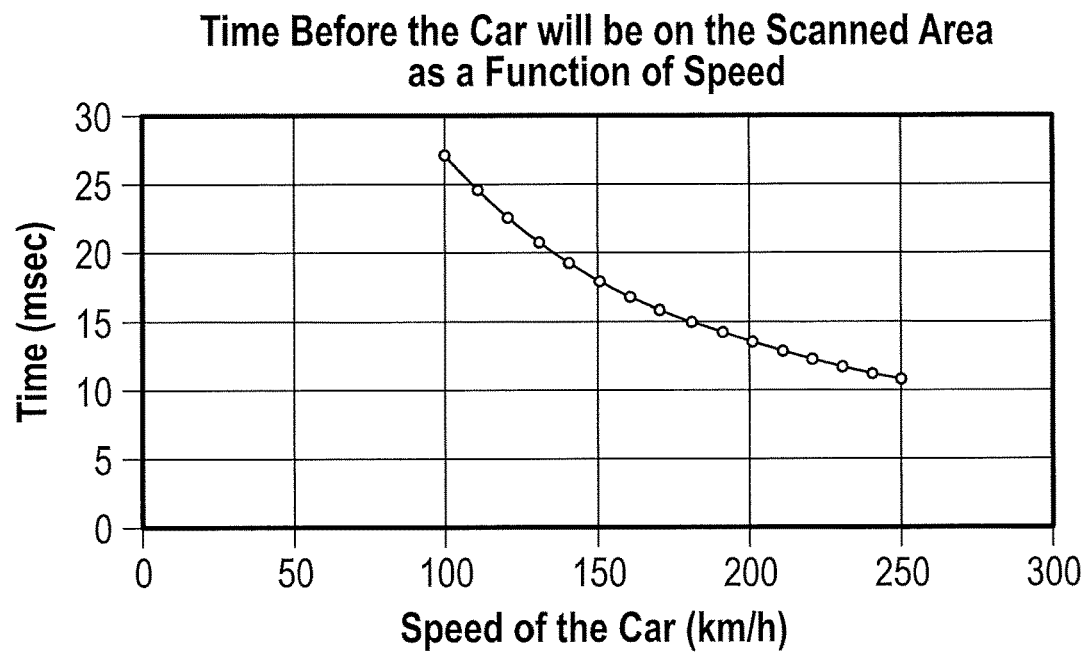
FIG. 10 is a graph of time to reach a change in grade, as detected by an embodiment of the present invention, as a function of vehicle speed.

As previously stated, embodiments of the invention can determine a change in the grade of the roadway prior to reaching such change in grade. FIG. 10 is a graph of time to reach a change in grade, as detected, as a function of vehicle speed. It will be apparent to the skilled artisan that advance notice of a change in grade allows the vehicle to make appropriate adjustments to the orientation of the vehicle or of the headlamp assembly e.g., through one or more actuators 230, as the vehicle approaches and arrives at the change in grade.

In one embodiment, the illuminator is a headlamp and the sensor is an onboard camera, such as that mounted in the bumper of the vehicle. The headlamp may be operated in accordance with a pulse-width modulation scheme having, for example, a 99% duty cycle (99% on and 1% off) at a frequency of f1. The camera may be operated in accordance with an integration frequency (i.e., time to collect a single image) of f2≠f1. The difference in frequencies produces a dark band in the image of the headlamp and the dimensions of this band corresponds to the time the light takes to go from the headlamp to the road and then from the road to the camera. This time can be used to compute the pitch angle θ in a manner similar to that described above. During daylight, the technique may be applied to the daytime running lights of the vehicle.

Figure 11:
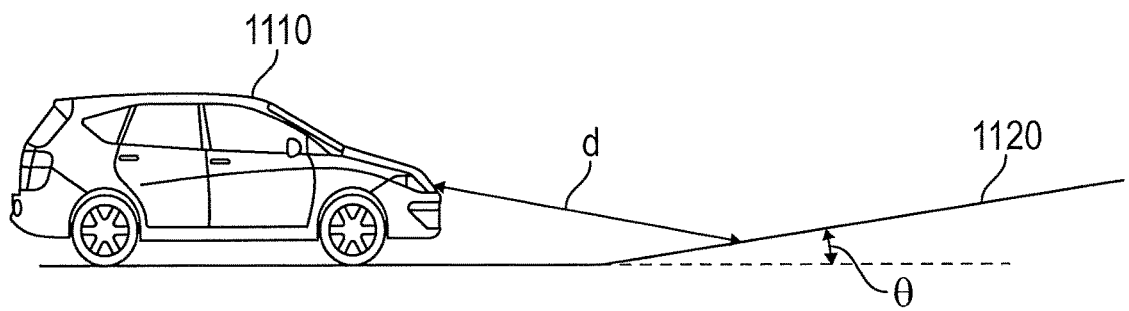
FIG. 11 is a diagram of a correction technique that can be realized in embodiments of the present invention.

FIG. 11 is a diagram of a correction technique that can be realized in embodiments of the present invention. As is illustrated in the figure, a vehicle 1110 approaches an incline 1120 with a grade of θ. In this example, orientation determining devices are installed in each headlamp assembly of vehicle 1110. The distance d and the angle θ can be determined by the techniques described above. However, the headlamp assemblies in which the orientation determining devices are installed may be out of alignment and comparing the mean of the captured data of both headlamp assemblies to predetermined reference data, such as calibration data set at the factory, the relative alignment of both headlamps may be determined and corrected, such as by the actuators described above.

Figure 12:
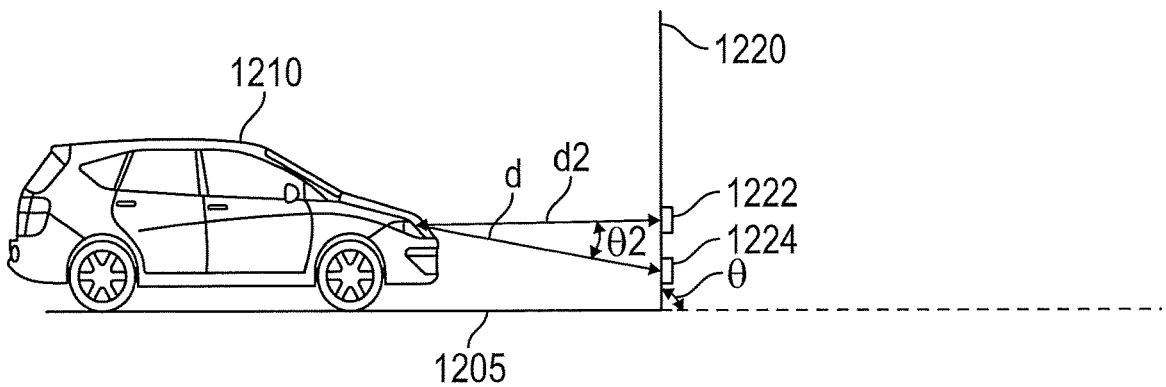
FIG. 12 is a diagram of another correction technique that can be realized in embodiments of the present invention

FIG. 12 is a diagram of another correction technique that can be realized in embodiments of the present invention. In the illustrated example, vehicle 1210 is an electric vehicle and is positioned to be recharged at a charging station 1220. Charging station 1220 may be installed at a fixed location relative to a parking surface 1205 such that its mounting orientation h, θ on the charging station's mechanical infrastructure relative to the parking surface is known.

Charging station 1220 may include its own rangefinder 1222 by which the distance d2 can be determined. Additionally, charging station 1220 may have a sensor 1224, such as one or more photodiodes, at the known height h relative to parking surface 1205. The height h may be chosen such that when vehicle 1210 is a distance d2 from charging station 1210, sensor 1220 is positioned at the cutoff region of the vehicle headlamps. The vehicle leveling system, e.g., one or more actuators, can be used to align the headlamps.

As will be appreciated by one skilled in the art, aspects of the present invention may be embodied as a system, method or computer program product. Accordingly, aspects of the present invention may take the form of an entirely hardware embodiment or an embodiment combining software (including firmware, resident software, micro-code, etc.) and hardware aspects that may all generally be referred to herein as a "circuit," "component," "module" or "system." Furthermore, aspects of the present invention may take the form of a computer program product embodied in one or more computer readable medium(s) having computer readable program code embodied thereon.

Computer program code for carrying out operations for aspects of the present invention may be written in any combination of one or more programming languages, e.g., an object oriented programming language such as Java, Smalltalk, C++ or the like, or a conventional procedural programming language, such as the "C" programming language or similar programming languages. It is to be understood that the software of the present invention embodiments may be developed by one of ordinary skill in the computer arts based on the functional descriptions contained in the specification and flow charts illustrated in the drawings.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems. The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. An apparatus for determining a spatial orientation of a vehicle, the apparatus comprising:
   a set of illuminators mechanically coupled to the vehicle so as to emit light toward a roadway, wherein a number of illuminators in the set is one and includes a headlamp of the vehicle configured to operate at a pulse width modulation frequency;
   a set of sensors mechanically coupled to the vehicle to receive emitted light as reflected from the roadway;
   a timer to determine a number of times of flight between emission of the emitted light by the set of illuminators and reception of reflected light by the set of sensors; and
   a processor to determine the spatial orientation of the vehicle from differences in the times of flight;
   wherein an angle of the vehicle with respect to the roadway is determined from a change in the times of flight relative to a reference difference in times of flight;
   wherein the processor computes the angle from the relationship:

$$\theta = \arctan\left(\frac{h\left(\frac{c\Delta t}{2\sqrt{h^2 + L2^2}}\right)}{L2\left(\frac{c\Delta t}{2\sqrt{h^2 + L2^2}}\right) - L1}\right),$$

where theta ($\theta$) is the angle, h is the height of the sensor as measured from the roadway, c is the speed of light, delta-t ($\Delta t$) is the change in the times of flight relative to the reference difference in the times of flight, L1 is the distance on the roadway from the sensor to a first measurement point on the roadway when the vehicle is level relative to the roadway and L2 is the distance on the roadway from a sensor to a second measurement point on the roadway when the vehicle is level relative to the roadway.

2. The apparatus of claim 1, wherein the number of illuminators in the set is at least two, said illuminators being mechanically coupled to the vehicle at a number of fixed angles therebetween.

3. The apparatus of claim 2, wherein each fixed angle is between 10 degrees and 25 degrees.

4. The apparatus of claim 1, wherein the number of illuminators in the set is four mounted in pairs at a number of separate locations on the vehicle at which the sensors are also mounted and the processor is further configured to:
   determine a number of pitch angles at said locations on the vehicle at which each pair of illuminators is mounted; and determine a number of roll angles from differences in said pitch angles.

5. The apparatus of claim 1, wherein a sensor is a camera having an integration frequency other than the pulse width modulation frequency of the headlamp.

6. The apparatus of claim 1, further comprising at least one actuator configured to compensate a lighting pattern on the roadway for the spatial orientation of the vehicle.

7. The apparatus of claim 6, wherein the actuator is mechanically coupled to a vehicle suspension to level the vehicle's body responsive to the spatial orientation of the vehicle being other than level with the roadway.

8. The apparatus of claim 6, wherein the actuator is mechanically coupled to a headlamp and configured to level the headlamp responsive to the spatial orientation of the vehicle being other than level with the roadway.

9. The apparatus of claim 1, wherein the processor is configured to determine whether a number of headlamps of the vehicle are aligned.

10. An automotive vehicle comprising:
    a set of illuminators mechanically coupled to said vehicle so as to emit light toward a roadway;
    a set of sensors mechanically coupled to said vehicle to receive a light emission as reflected from the roadway;
    a timer to determine a number of times of flight between an emission of light by the set of illuminators and a reception of reflected light by the set of sensors; and
    a processor to determine a spatial orientation of said vehicle from a difference in the number of times of flight;
    wherein a number of illuminators in the set is one and includes a headlamp of said vehicle configured to operate at a pulse width modulation frequency;
    wherein an angle of said vehicle with respect to the roadway is determined from a number of changes in the number of times of flight relative to a reference difference in the number of times of flight, wherein the processor computes the angle from the relationship:

$$\theta = \arctan\left(\frac{h\left(\frac{c\Delta t}{2\sqrt{h^2 + L2^2}}\right)}{L2\left(\frac{c\Delta t}{2\sqrt{h^2 + L2^2}}\right) - L1}\right),$$

where theta (θ) is the angle, h is the height of the sensor as measured from the roadway, c is the speed of light, delta-t (Δt) is the change in said times of flight relative to the reference difference in said times of flight, L1 is the distance on the roadway from the sensor to a first measurement point on the roadway when the vehicle is level relative to the roadway and L2 is the distance on the roadway from a sensor to a second measurement point on the roadway when the vehicle is level relative to the roadway.

11. The automotive vehicle of claim 10, wherein the number of illuminators in the set is at least two, said illuminators being mechanically coupled to said vehicle at a number of fixed angles therebetween.

12. The automotive vehicle of claim 11, wherein each fixed angle is between 10 degrees and 25 degrees.

13. The automotive vehicle of claim 10, wherein the number of illuminators in the set is four mounted in pairs at separate locations on said vehicle at which the sensors are also mounted and the processor is further configured to:
   determine a number of pitch angles at a number of locations on said vehicle at which each pair of illuminators is mounted; and
   determine a roll angle from a difference of said pitch angles.

14. An automotive vehicle comprising:
   a set of illuminators mechanically coupled to said vehicle so as to emit light toward a roadway;
   a set of sensors mechanically coupled to said vehicle to receive emitted light as reflected from the roadway;
   a timer to determine times of flight between a number of emissions of light by the set of illuminators and a reception of reflected light by the set of sensors; and
   a processor to determine a spatial orientation of said vehicle from a number of differences in the times of flight;
   wherein an angle of the vehicle with respect to the roadway is determined from a change in the times of flight relative to a reference difference in times of flight;
   wherein the processor computes the angle from the relationship:

$$\theta = \arctan\left(\frac{h\left(\frac{c\Delta t}{2\sqrt{h^2 + L2^2}}\right)}{L2\left(\frac{c\Delta t}{2\sqrt{h^2 + L2^2}}\right) - L1}\right),$$

where theta (θ) is the angle, h is the height of the sensor as measured from the roadway, c is the speed of light, delta-t (Δt) is the change in the times of flight relative to the reference difference in the times of flight, L1 is the distance on the roadway from the sensor to a first measurement point on the roadway when the vehicle is level relative to the roadway and L2 is the distance on the roadway from a sensor to a second measurement point on the roadway when the vehicle is level relative to the roadway
   wherein the number of illuminators in the set is one and includes a headlamp of said vehicle that is configured to operate at a pulse width modulation frequency;
   wherein said sensors include a camera having an integration frequency other than the pulse width modulation frequency of the headlamp.

* * * * *